(12) United States Patent
Delamarter et al.

(10) Patent No.: US 7,461,738 B1
(45) Date of Patent: Dec. 9, 2008

(54) RECIPROCATING SLAT CONVEYORS

(75) Inventors: Scott Michael Delamarter, Madras, OR (US); Daniel W. Jackson, Redmond, OR (US); James Prentice Drago, Metolius, OR (US)

(73) Assignee: Keith Manufacturing Co., Madras, OR (US)

( * ) Notice: Subject to any disclaimer, the term of this patent is extended or adjusted under 35 U.S.C. 154(b) by 31 days.

(21) Appl. No.: 11/823,914

(22) Filed: Jun. 30, 2007

(51) Int. Cl.
*B65G 25/04* (2006.01)
(52) U.S. Cl. .................................. 198/750.4; 198/750.3
(58) Field of Classification Search .... 198/750.2–750.4
See application file for complete search history.

(56) References Cited

U.S. PATENT DOCUMENTS

| | | | | |
|---|---|---|---|---|
| 3,019,215 A | * | 1/1962 | Weitz et al. ................. | 526/190 |
| 4,984,679 A | * | 1/1991 | Foster ....................... | 198/750.3 |
| 5,335,778 A | * | 8/1994 | Wilkens ................... | 198/750.3 |
| 5,547,067 A | * | 8/1996 | Foster ....................... | 198/750.3 |
| 5,655,645 A | * | 8/1997 | Foster ....................... | 198/750.3 |
| 5,806,660 A | * | 9/1998 | Foster ....................... | 198/750.3 |
| 5,996,772 A | * | 12/1999 | Foster ....................... | 198/750.3 |
| 6,257,396 B1 | * | 7/2001 | Quaeck .................... | 198/750.3 |
| 6,585,106 B1 | * | 7/2003 | Foster ....................... | 198/750.4 |
| 6,651,806 B2 | * | 11/2003 | Hallstrom ................. | 198/750.3 |
| 6,763,933 B1 | * | 7/2004 | Wilkens et al. ........... | 198/750.3 |
| 7,152,729 B2 | * | 12/2006 | Wilkens et al. ........... | 198/750.4 |
| 7,316,307 B2 | * | 1/2008 | Foster et al. .............. | 198/750.2 |

* cited by examiner

*Primary Examiner*—Mark A Deuble
(74) *Attorney, Agent, or Firm*—Delbert J. Barnard

(57) ABSTRACT

A reciprocating slat conveyor includes a plurality of side-by-side support beams (12) and conveyor slats (14) which fit onto the support beam (12). The support beams (12) are constructed from metal. The conveyor slats (14) are constructed from plastic. In one embodiment (FIGS. 1-4) the plastic slats (12) are snapped fit onto the support beams (12). In some other embodiments (FIGS. 6 and 7) the conveyor slats (110, 112) are slid lengthwise onto the support beams (102).

21 Claims, 5 Drawing Sheets

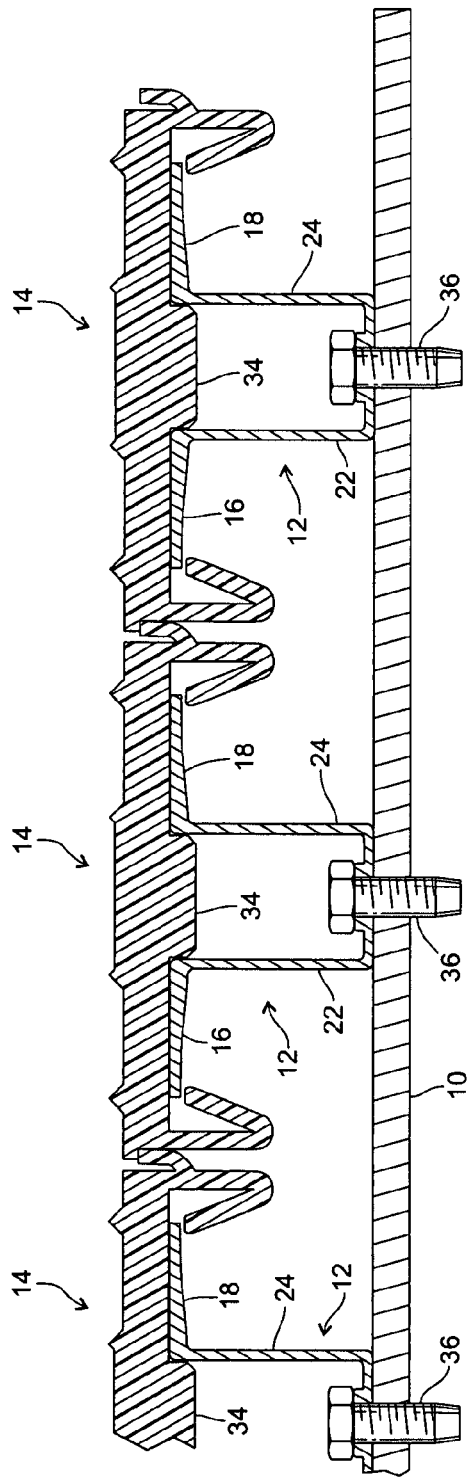
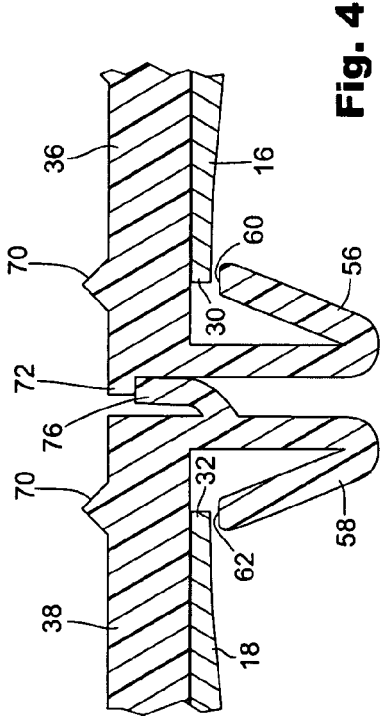
Fig. 3
Fig. 4

RECIPROCATING SLAT CONVEYORS

TECHNICAL FIELD

This invention relates to improvements in reciprocating slat conveyors and, in particular, to the provision of slats constructed from plastic and support beams constructed from metal and to physical forms of both the slats and support beams which results in a savings in materials and a savings in installation labor.

BACKGROUND OF THE INVENTION

Reciprocating slat conveyors basically comprise elongated slats which are divided into sets and groups. A popular reciprocating slat conveyor is composed of three sets and a number of groups which start on one side of the conveyor and extend over to the other conveyor. Each group includes one slat from each set. That is, group I starts with a slat from set I, followed by a slat from set II that is followed by a slat from set III. This pattern is repeated from group-to-group across the width of the conveyor. All of the slats are driven together in a conveying direction for an interval of travel (the stroke length). At the end of the stroke, the slats are stopped and are then returned to a start position, one set at a time. When all of the slats are back to a start position, the cycle is repeated. An example drive assembly is disclosed by U.S. Pat. No. 4,793,469, granted Dec. 27, 1988, to Raymond K. Foster. This patent presents a very comprehensive description of the operation of the drive mechanism and the way it moves the slats of the conveyor. The contents of U.S. Pat. No. 4,793,469 is hereby incorporated herein by this specific reference.

U.S. Pat. No. 5,447,322, granted Sep. 5, 1995, to Raymond K. Foster, discloses a system of plastic conveyor slats and metal support beams for the slats.

German Patent Publication DE 3,731,612 A1, published Sep. 19, 1987, and naming Albert Rappen as inventor, discloses a conveyor slat (FIG. 12) which may be constructed from plastic and a support frame which may be constructed from metal.

An object of the present invention is to provide a reciprocating slat conveyor that is an improvement on all of the above discussed prior art conveyors.

An object of the present invention is to provide a conveyor composed of a plurality of longitudinal support beams which can be easily and quickly bolted or riveted to subframe members and conveyor slats that can be easily and quickly snapped into a position on the support beams.

BRIEF SUMMARY OF THE INVENTION

The longitudinal support beams of the present invention have a bottom, a pair of laterally spaced apart sidewalls extending upwardly from the bottom, and a top comprising opposite side parts which project laterally outwardly from the tops of the sides. The bottom and the sides form lower corners where they meet and the sides and the side parts of the top form upper corners where they meet. An open space is defined between the sides and the side parts of the top. The side parts of the top have outer edge portions and upwardly directed support surfaces which extend substantially the full width of the side parts of the top.

The conveyor slats of the invention are elongated members. Some embodiments have a downwardly projecting center portion that is sized to fit within the open space in its support beam. Each such conveyor slat includes side portions having lower surfaces which rest on the slat supporting surfaces of the support beams. The side portions of the slats extend laterally outwardly beyond the outer edges of the side parts of the tops of the support beams. Each slat has a pair of slat sidewalls extending downwardly from the side portions of the conveyor slat. A lock flap extends upwardly and inwardly from each slat sidewall to an upper edge. The upper edges of the lock flaps are positioned below the side parts of the top of the support beam in the slat is supported on the support beam with its central portion in the open space. According to the invention, the conveyor slat is formed from a plastic material and the support beam is formed from metal.

In preferred form, the longitudinal support beam sit down on longitudinally spaced apart transverse support beams. Fasteners connect the bottoms of the longitudinal support beams to the transverse support beams.

Preferably, one side portion of each slat includes a longitudinally extending, laterally outwardly projecting lip, having a lower surface. The second side portion of each conveyor slat has a longitudinally extending side portion with an upper edge that is positioned below the lower surface of the lip. When the slats are installed, the lower surface of the lip on one slat confronts and contacts the upper edge of the second side portion on the adjacent slat.

Preferably, the side portion that includes the upper edge is in the nature of a flap that is connected at its bottom to the adjacent sidewall of the slat.

Preferably, the lateral distance between the outer edges of the side parts of the top is less than the lateral distance between the sidewalls of the conveyor slat and is greater than the lateral distance between the upper edges of the lock flaps when the slat is on the support beam and the upper edges of the lock flaps are below the outer edges of the side parts of the top of the support beam. Preferably, the lock flaps are bendable so that the conveyor slat can be set down onto the support beam with the lock flaps contacting the outer edges of the side parts of the top of the support beam. A downward movement of the conveyor slat towards the support beam will cause contact between the outer edges of the side parts of the top of the support beam and the lock flaps. Such downward movement will cause the outer edges of the side parts of the top to push the lock flaps apart and allow them to snap into a lock position below the outer edges of the side parts of the top. When the lower surfaces of the side parts of the conveyor slat are in supported positions on the support surfaces of the support beam, the upper edges of the lock flaps are positioned below the outer edges of the side parts of the top of the support beam.

Other embodiments of the invention includes slats that have shoulders provided at the outer edges of the side parts of the top of the support beam. These slats are snapped in place and contact between the outer edges of the support beam and the shoulders on the slats holds the slat centered with respect to the support beam. The downwardly projecting center portion is omitted from these slats.

The present invention includes providing plastic slats that are slid endwise onto the tops of the support beams, i.e. the slats do not snap down onto the support beams.

Other more detailed features of the invention are described in the description of the illustrated embodiment and are particularly pointed out in the appended claims.

BRIEF DESCRIPTION OF THE SEVERAL VIEWS OF THE DRAWINGS

Like reference numerals referred to like parts throughout the several views of the drawing, and:

FIG. 3 is a fragmentary sectional view taken substantially along line 3-3 of FIG. 1;

FIG. 4 is an enlarge scale fragmentary view of a portion of FIG. 3 showing where one side portion of a first conveyor slat meets an adjacent side portion of an adjoining conveyor slat;

DETAILED DESCRIPTION OF THE ILLUSTRATED EMBODIMENT

Figure 1:
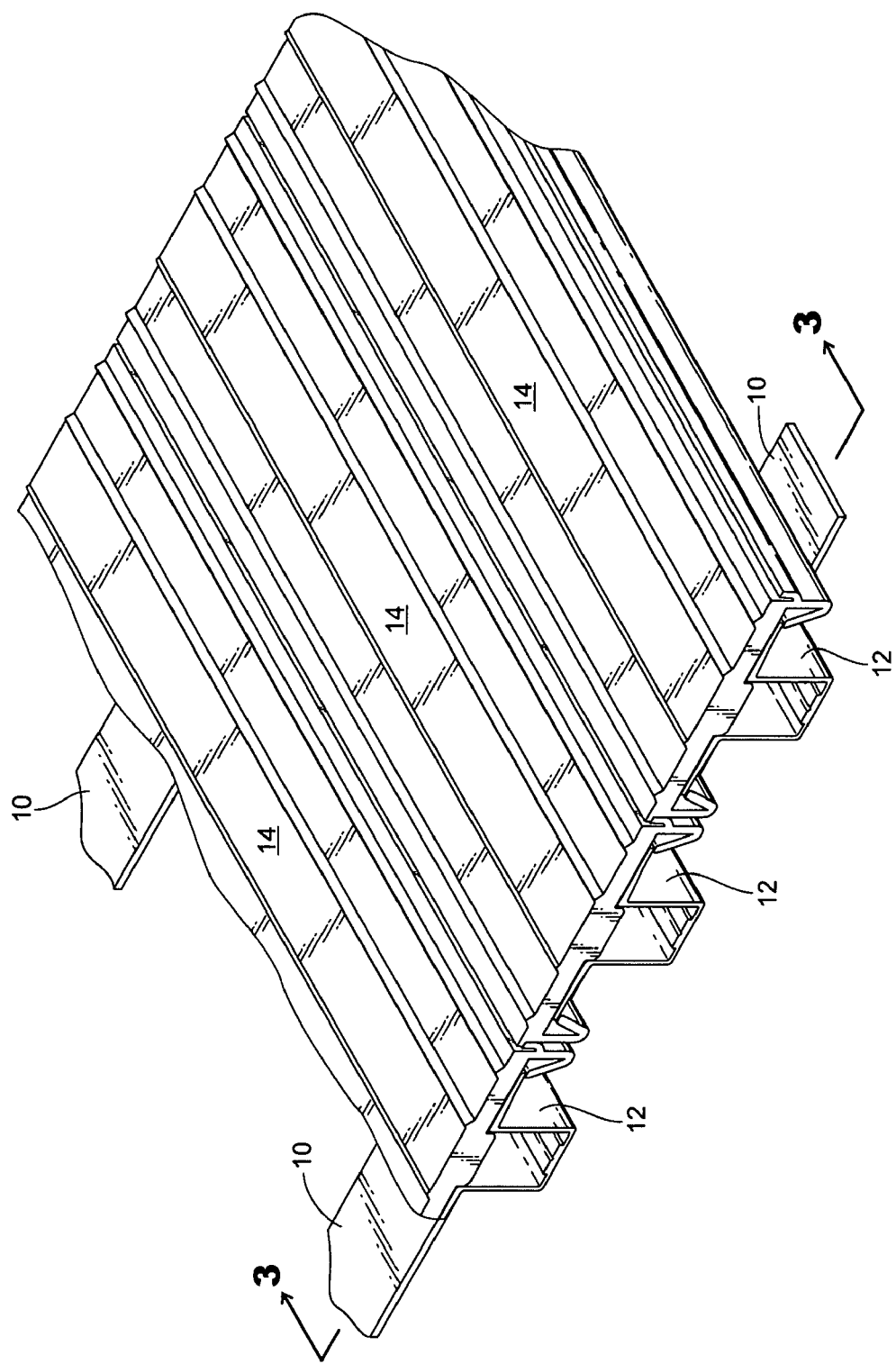
FIG. 1 is a fragmentary pictorial view of an embodiment of the invention, such view being taken from above and looking towards the top, one end and one side of the conveyor structure that is shown by FIG. 1.

As shown by the drawings, the embodiment illustrated by FIG. 1—comprises a plurality of longitudinally spaced apart transverse frame members 10 that are each a part of a substructure. A plurality of longitudinally extending, side-by-side support beams 12 are connected to the members 10. Each support beam 12 supports an elongated conveyor slat 14 for back and forth movement lengthwise of the support beam 12. In a typical conveyor, the length of the conveyor slats 14 and support beams 12 may lie between twenty-four and forty feet. The conveyor may be twenty-four slats wide, divided into to three sets of eight slats per set. The slats 14 are arranged laterally across the conveyor, a slat 14 from first set, then a slat 14 from the second set and then a slat 14 from the third set. Then, this pattern is repeated all the way across the conveyor. As is well known, in use, this type of slat conveyor is operated to move all of the slats 14 together in a conveying direction for a stroke length of 10 inches to 12 inches, for example. As the slats 14 move, they move with them the load that is on the slats 14. At the end of the stoke, the slats 14 are retracted, one set at a time. That is, set one is retracted to a start position. Then, set two is retracted to a start position. Then, set three is retracted to a start position. Next, all of the slats 14 are moved again in the conveying direction for another stroke length. This pattern of operation is repeated until material on the conveyor is either loaded or unloaded, depending on the direction of operation.

The transverse frame members 10 are shown in the form of flat bars. However, they will most likely be I-beams or channel beams.

Referring to the drawings, the support beams 12 are in the form of upwardly opening channels having relatively wide flanges 16, 18 extending in opposite directions at the top of the beam 12. Each channel is formed by a bottom 20 have inside boundaries and sides 22, 24 which extend upwardly from the side boundaries of the bottom 20. Sides 22, 24 are spaced apart and are parallel to each other and are perpendicular to the bottom 20. The flanges 16, 18 form side parts of a top. These side parts 16, 18 are connected to upper boundaries of the sides 22, 24. Side part 16 extends substantially perpendicular to side 22 and side part 18 extends substantially perpendicular to side 24. The corner is formed where side parts 16 meets side 22 and where side part 18 meets side 24. Parts 16, 22 are connected together at corner 26 and parts 18, 24 are connected together at corner 28. Preferably, top parts 16, 18 are thicker at the corners 26, 28 and they gradually become thinner as they extend outwardly to side edge portions 30, 32. Preferably, the center portion of the bottom 20 is thickened at its center. The support beams 12 are preferably connected to the sub frame beams 10 by the fastener 36 that extends through the thickened region 34 and then through the frame members 10.

The central portion of the support beams 14 is open at the upper end of the channel. This allows insertion of the fasteners 36 downwardly to the bottom 20 and also permits the use of instillation tool that is inserted downwardly into this open space 30.

Figure 2:
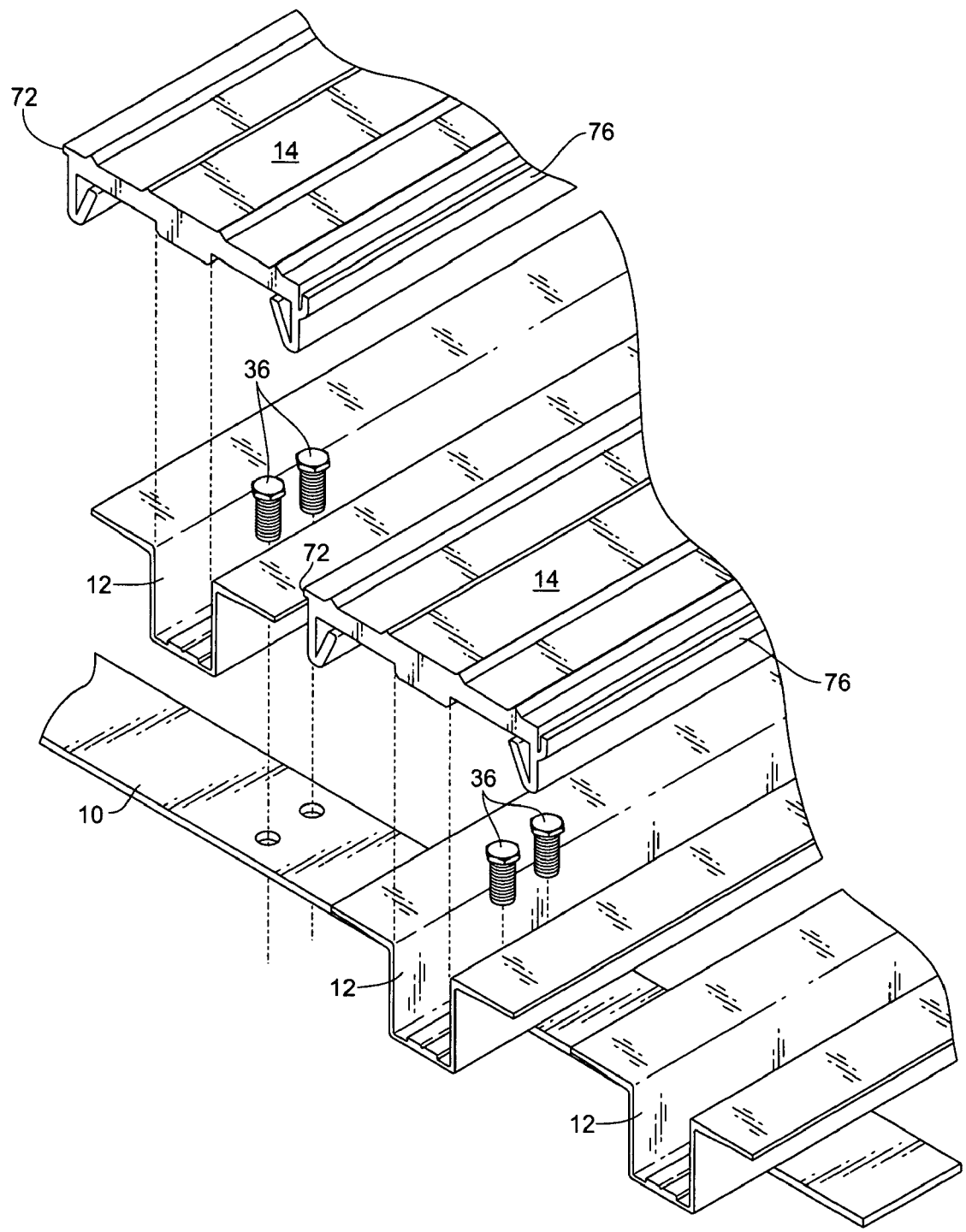
FIG. 2 is an exploded pictorial view of the assembly shown by FIG. 1, with the conveyor slat for the support beam shown on the right side of the view being omitted.
Figure 2A:
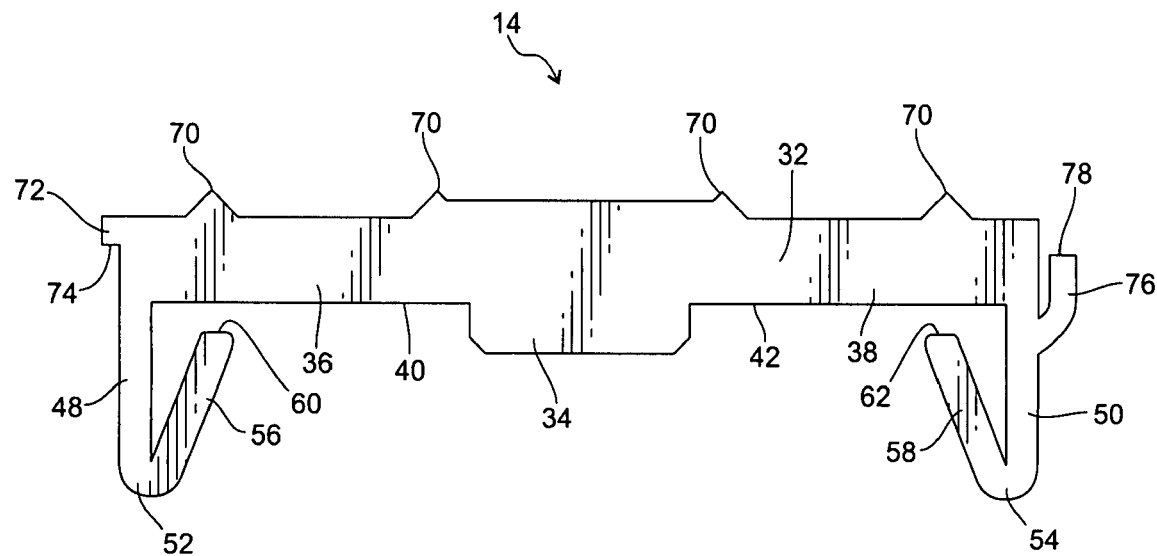
FIG. 2A is an enlarged scale end view of one of the conveyor slats.
Figure 2B:
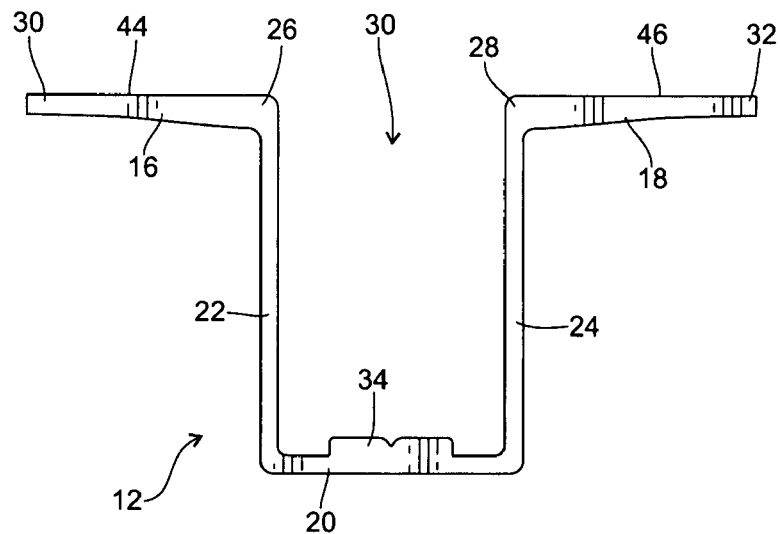
FIG. 2B is an enlarged scale end view of one of the support beams.

FIG. 2A is an end view of one of the conveyor slats 14 it has a top 32 that extends the full width of the slat 14. The bottom of the top 32 has a central portion 34 and side portions 36, 38. As best shown by FIG. 3, the central portion 34 fits down into the space 30 between the corners 26, 28 at the same time, the lower surfaces 40, 42 on sections 36, 38 rest on the upper slats supporting surfaces 44, 46 on the side parts 16, 18 of the top of the support beam 12. Central portion 34 plugs into the opening 30 and centers the slat 14 on the support beam 12. Flat 14 have sidewalls 48, 50 that depend from the outer boundaries of the top 32. Sidewall 48 extends downwardly to a corner 52. Sidewall 50 extends downwardly to a corner 54. Pair of lock flaps 56, 58 extends upwardly and inwardly from the corners 52, 54. Lock flap 56 has a top edge 60 and lock flap 58 has a top edge 62. As shown by FIG. 4, when the conveyor slat 14 is installed on the support beam 12, the side edge portions 30, 32 of the top parts 16, 18 of the support beam 12 are positioned between the edges 60, 62 and the surfaces 40, 38.

The conveyor slat 14 preferably comprises a plurality of longitudinally extending ridges 70. The sides of the ridges converge from the bottom up to a relatively sharp apex line. These ridges serve to dig into solid loads for keeping them straight on the slats 14.

One side of each slat 14 includes a longitudinally extending laterally projecting lip 72 having a lower surface 74. The opposite side of the conveyor slat 14 includes a side portion 76 that maybe in the nature of a flap having an upper edge 78. As shown by FIG. 4, when the conveyor slats 14 are installed on the support beams 12, the lip 72 on one side of each slat 14 over hangs the edge 78 on the opposite side of the adjacent slat 14. As best shown by FIG. 4, lip surface 74 confronts and most likely contacts edge surface 78.

Figure 5:
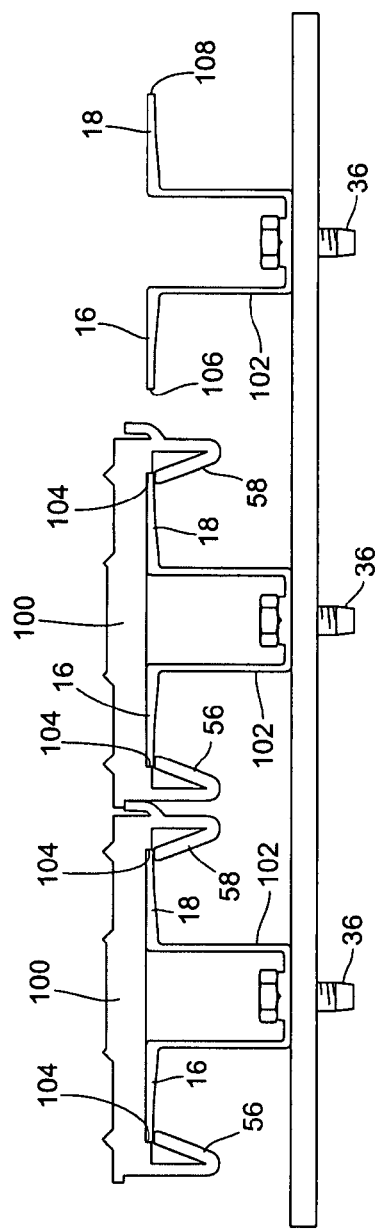
FIG. 5 is an end elevational view showing three support beams and two slats on an adjacent pair of the support beams, such view showing the elimination of the downwardly projecting center portions from the slats, such view showing the side edges of the two side parts of the top of the support beam closely confronting shoulders on lower side portions of the slats. The lateral space between the shoulders is slightly wider than the lateral space between the side edges of the support beams. The shoulders and side edges cooperate to maintain the slats substantially centered on the support beams.

The slats 100 and support beams 102 shown by FIG. 5 have the same basic configuration as the slats 14 and support beams 12 shown by FIG. 3. A difference is that the downwardly projecting central portion is omitted from the slats 100. In this embodiment, the slats are centered by shoulders 104 formed in lower sidewall portions of the slats. In this embodiment, the upper side parts 16, 18 of the beams 102 have opposite outer side edges 106, 108 that are positioned close to the shoulders 104. The sideways dimension between the edges 106, 104 is slightly smaller than the spacing between the two shoulders 104. As can be seen, if the slat 100 should want to move sideways, there will be contact between an edge 106, 108 and the adjoining shoulder 104 that will prevent such movement.

Figure 6:
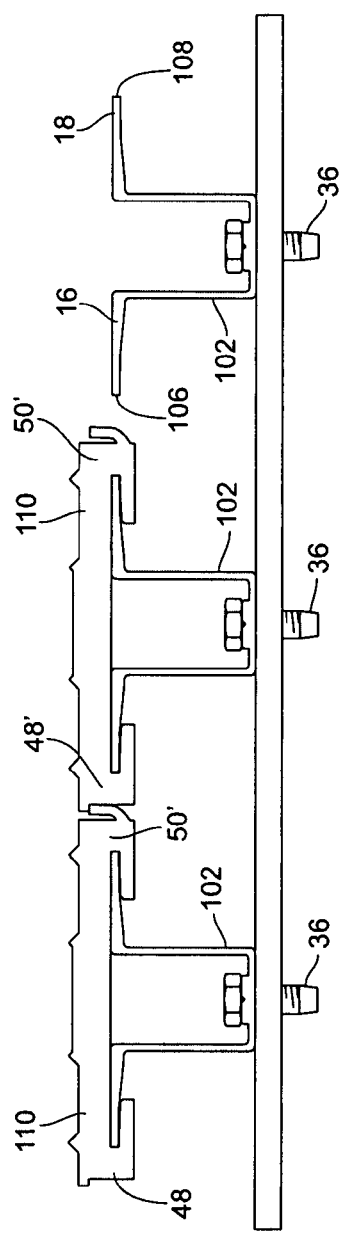
FIG. 6 is a view like FIG. 5, but minus the "snap-on" flaps on the conveyor slats, such conveyor slat being constructed to be slid endwise onto the support beams.

FIG. 6 shows slats 110 which do not include the flaps 58, 68. As a result, it is necessary to install the slats 110 on the beams 102 by sliding the beams endwise onto the upper side portions 16, 18 of the guide beams 102. In this embodiment, the outer edges 106, 108 on the guide beams 102 are contiguous the inside surfaces of the sidewalls 48', 50'. Again, in this embodiment, the side-to-side spacing of the inner surfaces of the sidewalls 48', 50' is only slightly larger than the side-to-side spacing of the guide beam edges 106, 108.

Figure 7:
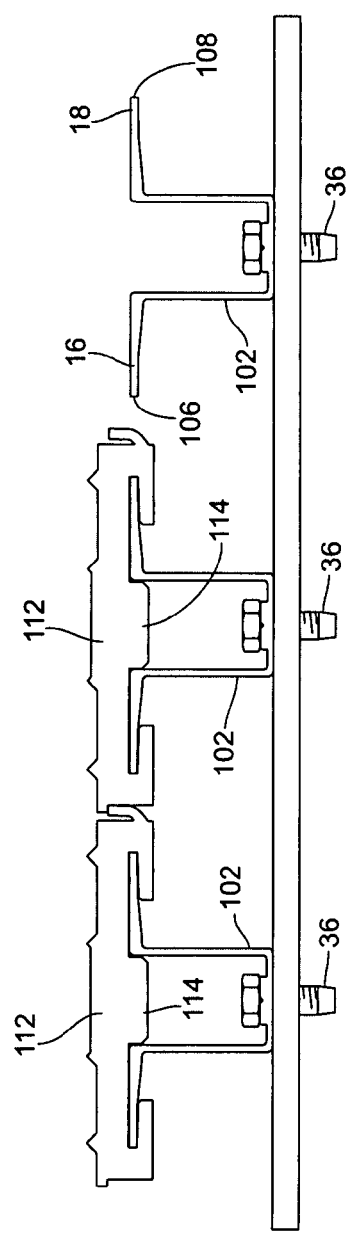
FIG. 7 is a view like FIG. 6, but showing downwardly projecting center portions on the slats that are sized to fit within the open spaces in the support beams.

FIG. 7 shows a further embodiment of the conveyor slat/support beam assembly. This embodiment is like the embodiment shown by FIG. 6 except that the slat 112 is provided with a downwardly projecting center portion 114 that is like the center portion 34 of slat 14. Each slat 112 is slid endwise onto its support beam 102 such as the slats 100, 110.

Preferably, all of the fasteners 36 are huck bolts. Of course, conventional bolts may be used. Also, pop rivets may be used. There are fasteners that can be installed from one side of a member. As shown in U.S. Pat. No. 5,996,772, granted Dec. 7, 1999, to Raymond Keith Foster, the bolts or rivets can be installed by a tool that is inserted down into the open space between the sidewalls 22, 24 of the beams 12, 102. The contents of U.S. Pat. No. 5,996,772 are herein incorporated by reference.

In the embodiment shown by FIGS. 5-7, the side members 76 perform the same function as they do in the first embodiment. Each side member 76 presents an upper edge 78 that is positioned to confront the bottom 74 of the associated lip 72. In the embodiment shown by FIGS. 6 and 7, the slats 110, 112 are installed one at a time. For example, referring to FIG. 6, if the slat 110 on the left is installed when the slat 110 on the right is being installed, at the start of the installation of the slat on the right, there will have to be an inward movement on the flap 76 so that the left side of the slat 110 that is being installed will slide along the flap 76 on the installed slat 110.

The illustrated embodiments are only examples of the present invention and, therefore, are non-limitive. It is to be understood that many changes in the particular structure, materials and features of the invention may be made without departing from the spirit and scope of the invention. Therefore, it is our intention that our patent rights not be limited by the particular embodiments that are illustrated and described herein, but rather are to be determined by the following claims, interpreted according to accepted doctrines of patent claim interpretation.

What is claimed is:

1. A conveyor slat/support beam assembly, comprising:
    a longitudinal support beam having a bottom, a pair of laterally spaced apart sides extending upwardly from the bottom, and a top comprising side parts projecting laterally outwardly from the sides, said bottom and said sides forming lower corners where they meet and said sides and said side parts of the top forming upper corners where they meet, wherein an open space is defined laterally between the sides of the support beam and between the side parts of the top of the support beam, said side parts of the top having outer edges and upwardly directed slat supporting surfaces for a conveyor slat; and
    an elongated conveyor slat having side portions with lower surfaces which rest on the slat supporting surfaces of the support beam, a pair of sidewalls extending downwardly from the sides of the top of the slat, and inner portions on the sidewalls which present an upper edge spaced below the bottom surface of the top of the slat, and
    wherein the outer edges of the side parts of the top of the support beam fit within spaces vertically between the inner portions of the sidewalls and the bottom surfaces of the side parts of the top of the conveyor slat.

2. The conveyor slats/support beam assembly of claim 1, wherein the conveyor slat is snapped fit down onto the support beam.

3. The conveyor slat/support beam assembly of claim 1, wherein the conveyor slat is slid lengthwise onto the support beam.

4. A conveyor slat/support beam assembly, comprising:
    a longitudinal support beam having a bottom, a pair of laterally spaced apart sides extending upwardly from the bottom, and a top comprising side parts projecting laterally outwardly from the sides, said bottom and said sides forming lower corners where they meet and said sides and said side parts of the top forming upper corners where they meet, wherein an open space is defined between the sides and the side parts of the top, said side parts of the top having outer edges and upwardly directed slat supporting surfaces for a conveyor slat; and
    an elongated conveyor slat having a downwardly projecting center portion that fits within the open space in the support beam, and side portions having lower surfaces which rest on the slat supporting surfaces of the support beams, said side portions of the slat extending laterally outwardly beyond the outer edges of the side parts of the top of the support beam, a pair of slat sidewalls extending downwardly from the side portions of the conveyor slat, and a lock flap extending upwardly and inwardly from each slat sidewall to an upper edge, and said upper edges of the lock flaps being positioned below the side parts of the top of the support beam when the slat is supported on the support beam with its central portion in the open space, and wherein the conveyor slat is formed from a plastic material and the support beam is formed from metal.

5. The conveyor slat/support beam assembly of claim 4, comprising a transverse support beam below the bottom of the longitudinal support beam, and a fastener connecting the bottom of the longitudinal support beam to the transverse support beam.

6. The conveyor slat/support beam assembly of claim 4, wherein one side portion of the slat includes a longitudinally extending, laterally outwardly projecting lip, having a lower surface, and the second side portion of the conveyor slat has a longitudinally extending side portion with an upper edge that is positioned below the lower surface of the lip and makes, and makes contact with a downwardly directed surface on a lip of an adjoining slat.

7. The conveyor slat/support beam assembly of claim 6, wherein the side portion that includes the upper edge is in the nature of a flap that is connected at its bottom to the adjacent sidewall of the slat.

8. The conveyor slat/support beam assembly of claim 4, wherein the conveyor slat is made from UHMW plastic.

9. The conveyor slat/support beam assembly of claim 4, wherein the lateral distance between the outer edges of the side parts of the top is less than the lateral distance between the sidewalls of the conveyor slat and greater than the lateral distance between the upper edges of the lock flaps when the slat is on the support beam and the upper edges of the lock flaps are below the outer edges of the side parts of the top of the support beam.

10. The conveyor slat/support beam assembly of claim 9, wherein the lock flaps are bendable so that the conveyor slat can be set down onto the support beam with the lock flaps contacting the outer edges of the side parts of the top of the support beam, and a downward movement of the conveyor slat towards the support beam will cause contact between the outer edges of the side parts of the top of the support beam and the lock flaps, and such downward movement will cause the outer edges of the side parts of the top to push the lock flaps apart and allow them to snap into a lock position below the outer edges of the side parts of the top, and when the lower surfaces of the side parts of the conveyor slat are in supported positions on the support surfaces of the support beam, the upper edges of the lock flaps will be positioned below the outer edges of the side parts of the top of the support beam.

11. The conveyor slat/support beam assembly of claim 10, wherein one side portion of the slat includes a longitudinally extending, laterally outwardly projecting lip, having a lower surface, and the second side portion of the conveyor slat has a longitudinally extending side portion with an upper edge that is positioned below the lower surface of the lip and makes contact with the downwardly directed surface on the lip of the adjoining slat.

12. The conveyor slat support beam assembly of claim 11, wherein the longitudinally extending side portion on the second side of the conveyor slat is a flap that extends upwardly and outwardly from the second side of the conveyor slat, said flap being in the nature of a cantilever spring which will bend inwardly to allow the flap to move passed the lip of the adjoining slat and move into a position below that lip.

13. A reciprocating slat conveyor, comprising:

a sub frame;

a plurality of longitudinal support beams positioned side-by-side on the sub frame, each said support beam having a support beam having a bottom, a pair of laterally spaced apart sides extending upwardly from the bottom, and a top comprising side parts projecting laterally outwardly from the sides, said bottom and said sides forming lower corners where they meet and said sides and said side parts of the top forming upper corners where they meet, wherein an open space is defined between the sides and the side parts of the top, said side parts of the top having outer edges and presenting upwardly directed slat supporting surfaces for a conveyor slat; and an elongated conveyor slat on each support beam, each conveyor slat having a downwardly projecting center portion that fits within the open space in the support beam, and side portions having lower surfaces which rest on the support surfaces of the slat supporting beams, said side portions of the slat extending laterally outwardly beyond the outer edges for the conveyor slat, a pair of slat sidewalls extending downwardly from the side portions of the conveyor slat, and a lock flap extending upwardly and inwardly from each slat sidewall to an upper edge, and said upper edges of the lock flaps being positioned below the side parts of the top of the support beam when the slat is supported on the support beam with its central portion in the open space, and wherein the conveyor slat is formed from a plastic material and the support beam is formed from metal.

14. The conveyor of claim 13, said sub frame comprising a plurality of transverse support beam below the bottoms of the longitudinal support beams, and a fastener connecting the bottom of each longitudinal support beam to the transverse support beam below it.

15. The conveyor of claim 13, wherein a first side portion of each slat includes a longitudinally extending, laterally outwardly projecting lip, having a lower surface, and the second side of each slat has a longitudinally extending side portion with an upper edge that is positioned below the lip of the adjoining slat.

16. The conveyor of claim 13, wherein the side portion that includes the upper edge is in the nature of a flap that is connected at its bottom to the adjacent sidewall of the slat.

17. The conveyor of claim 13, wherein each conveyor slat is made from UHMW plastic.

18. The conveyor of claim 13, wherein the lateral distance between the outer edges of the side parts of the top of each support beam is less than the lateral distance between the sidewalls of the conveyor slat and greater than the lateral distance between the upper edges of the lock flaps when the slat is on the support beam and the upper edges of the lock flaps are below the outer edges of the side parts of the top of the support beam.

19. The conveyor of claim 13, wherein the lock flaps are bendable so that the conveyor slat can be set down onto the support beam with the lock flaps contacting the outer edges of the side parts of the top of the support beam, and a downward movement of the conveyor slat towards the support beam will cause contact between the outer edges of the side parts of the top of the support beam and the lock flaps, and such downward movement will cause the outer edges of the side parts of the top to push the lock flaps apart and allow them to snap into a lock position below the outer edges of the side parts of the top, and when the lower surfaces of the side parts of the conveyor slat are in the supported positions on the support surfaces of the support beam, the upper edges of the lock flaps will be positioned below the outer edges of the side parts of the top of the support beam.

20. The conveyor of claim 19, wherein one side portion of the slat includes a longitudinally extending, laterally outwardly projecting lip, having a lower surface, and the second side portion of the conveyor slat has a longitudinally extending side portion with an upper edge that is positioned below the lower surface of the lip and makes contact with the downwardly directed surface on the lip of the adjoining slat.

21. The conveyor of claim 20, wherein the longitudinally extending side portion on the second side of the conveyor slat is a flap that extends upwardly and outwardly from the second side of the conveyor slat, said flap being in the nature of a cantilever spring which will bend inwardly to allow the flap to move passed the lip of the adjoining slat and move into a position below that lip.

* * * * *